Feb. 16, 1960
B. MICHALKO
2,924,852
METHOD FOR SHAPING THERMOPLASTIC FABRICS
Filed Aug. 21, 1956
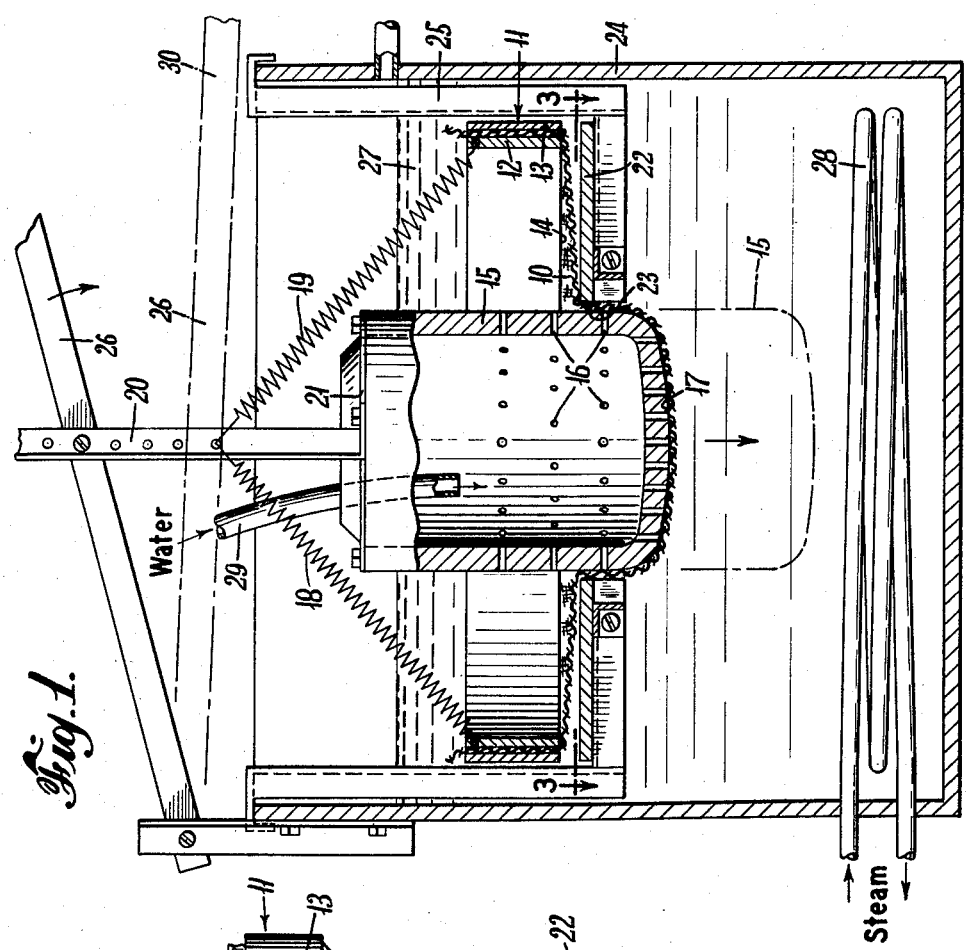
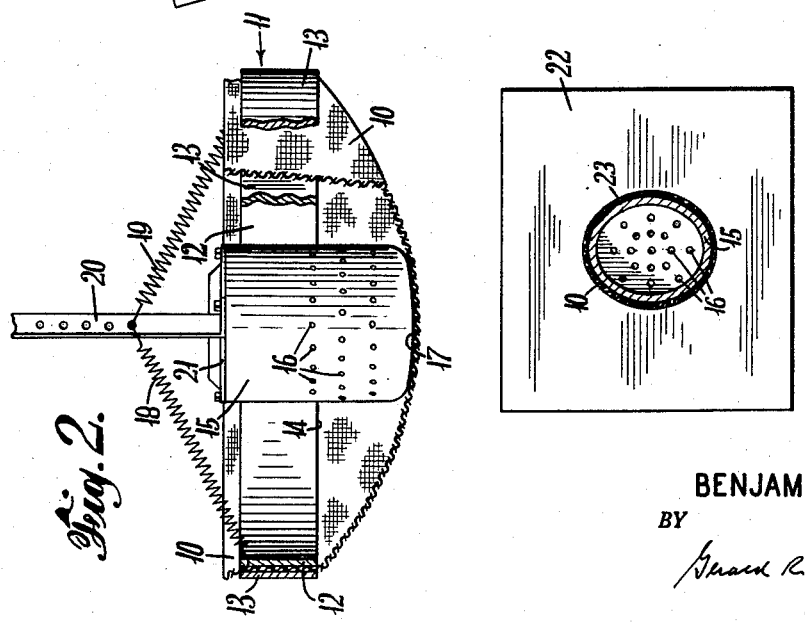
INVENTOR.
BENJAMIN MICHALKO
BY
ATTORNEY

United States Patent Office 2,924,852
Patented Feb. 16, 1960

2,924,852

METHOD FOR SHAPING THERMOPLASTIC FABRICS

Benjamin Michalko, Charleston, W. Va., assignor to Union Carbide Corporation, a corporation of New York Application August 21, 1956, Serial No. 605,379

2 Claims. (Cl. 18—56)

This invention relates to thermoplastic resins, and more particularly, to an improved method for shaping textile fabrics composed of thermoplastic fibers.

The manufacture of wearing apparel and other textile articles by the molding or shaping of thermoplastic fabrics has been an attractive goal for many years. The usual method for producing articles of this nature, e.g. hats, brassiere cups, shoe uppers, etc., is to suitably heat the thermoplastic material to a temperature permitting deformation, and while the fabric is hot, to stretch or draw the material into a desired shape. After formation is complete, the fabric is then set by an effective reduction of temperature. In this manner, a thermoplastic fabric may be formed into the symmetrical or irregular three dimensional shapes often required for the type of articles heretofore mentioned. This method of operation, however, possesses certain disadvantages which may prevent its satisfactory utilization for the production of many shaped thermoplastic textiles. During the procedure, a greater degree of strain is engendered in certain fabric areas by the application of distortional stress or tension sufficient to obtain the required maximum displacement from the original plane of the material. For instance, in the manufacture of hats, as heretofore mentioned, this area of high strain would be found in the crown of the hat, as compared to the minor fabric strain found in the brim. As a result of the unequal imposition of strain within various fabric areas, the finished products are generally characterized by undesirable differences in fabric porosity and general appearance. In addition, structural weaknesses within the shaped articles are produced, and the flexibility of their design is substantially diminished.

It is an object of the present invention to overcome the disadvantages of the prior art by providing for the production of shaped thermoplastic textile fabrics, the articles produced exhibiting a high degree of uniformity in fabric construction, porosity and general appearance.

It is another object of the present invention to provide for the production of shaped textile fabrics composed of thermoplastic fibers, wherein fabric strain may more uniformly be imposed during the shaping operation.

Still other objects will become apparent from the following description.

The objects of the present invention are achieved by shaping an initially heated thermoplastic fabric into desired form under conditions permitting a distribution and balance of deformational effects throughout the fabric during the shaping operation. Of prime importance to the method is the immediate reduction of temperature in fabric areas to which greatest distortional stress is applied, the temperature reduction being effected concurrently with the shaping of the fabric. This reduction of temperature within fabric areas being displaced the most from their original plane renders these areas more resistant to the application of distortional stress or tension. Other remote fabric areas remaining at the higher temperature level originally imposed are, therefore, more plastic, and permit relatively rapid and easy deformation. In this manner, wherein the temperature levels of the various fabric areas heretofore mentioned may be controlled and varied, strain, imposed by the application of distortional stress or tension to the fabric, may be more evenly distributed. Any other means for reducing the temperature of the fabric in those areas to which greatest distortional stress is applied, the temperature reduction being concurrent with the shaping operation, may also be employed. The utilization of the improved method of the invention thereby results in the production of shaped textile articles exhibiting a substantially high degree of uniformity in structure and general appearance throughout the fabric.

In an embodiment of the invention, the shaping of a thermoplastic fabric is accomplished by stretching or drawing the fabric into form by means of a suitably shaped mold and a shaping ring of convenient size. Conformation of the material to the desired shape of the mold is effected by a movement of the mold and shaping ring relative to each other, whereby the fabric and mold are passed through the shaping ring in a manner assuring the maintenance of the fabric and mold in substantially continuous contact. This operation is necessarily performed in the presence of a constant source of heat, sufficient to initially elevate the temperature of the thermoplastic material to a degree which will permit permanent deformation as stress is applied. The uniform introduction of heat to the fabric is vital to the method, for an uneven heat treatment will ultimately result in a heerogeneous fabric structure in the articles produced.

In a preferred form, the embodiment comprises employing a cooling arrangement during the stretching operation, whereby the mold may be maintained at a temperature below that to which the fabric has been initially elevated. As the mold and fabric are passed through the shaping ring, thereby forcing the fabric into desired shape, the thermoplastic material contacting the cooler mold is immediately reduced in temperature. The material contacting the mold, to which maximum distortional stress is being applied, is thereby rendered less plastic than the remaining fabric. In this manner, the otherwise unequal imposition of strain effected by a non-uniform application of stretching tension to the various fabric areas is minimized.

When the originally substantially planar fabric has been drawn to the extent desired, the cooling arrangement effecting the reduction of mold temperature is discontinued, allowing the various fabric areas within the shaped article to attain temperature equilibrium. The initial heating source which has been employed throughout the procedure is then removed, and the fabric set or hardened by a reduction of temperature.

The improved method of the invention may be better understood from the following description, when read in connection with the accompanying drawings, wherein Fig. 1 is a sectional elevation showing an apparatus for the production of shaped thermoplastic fabrics.

Fig. 2 is a sectional elevation in reduced size illustrating the initial positioning of fabric and mold prior to the stretching operation Fig. 3 is a transverse sectional view in reduced size along line 3—3 of Fig. 1, showing the shaping plate, thermoplastic fabric and mold.

In accordance with the present invention, the initial positioning of the fabric, as shown in Fig. 2, is carried out by placing a relatively flat fabric 10, made from thermoplastic fibers, in a ring clamp 11 of convenient size, comprised of annular ring clamp members 12 and 13, between which the fabric is held, preferably with sufficient fullness or slack so that the center of the fabric hangs below the plane of the ring clamp edge 14. A suitably shaped hollow form mold 15, possessing a number of perforations 16, is placed in the center of the fabric 10 in a manner whereby the apex area of the mold 17, contacting the fabric 10, uniformly exerts slight pressure thereon. This slight pressure of the mold 15 against the fabric 10 is achieved by means of small attached springs 18 and 19, affixed at one end to annular ring clamp member 12, and at the other end, to a connecting rod 20 extending from the base 21 of the mold 15.

The complete assembly shown in Fig. 2 is then transferred to the remaining apparatus as shown in Fig. 1, wherein the assembly is placed over a shaping plate 22, having a central opening or shaping ring 23, of just sufficient diameter to permit the passage of the mold 15 and the fabric 10, i.e., substantially equal in diameter to the diameter of the mold plus twice the thickness of the thermoplastic fabric. (See Fig. 3). The shaping plate 22 is supported within a containing vessel 24, preferably made of stainless steel, by means of a supporting rack 25, having a central opening of equal diameter and concentric with the shaping ring 23. The connecting rod extension 20 of the mold 15 is suitably attached to a pressure handle 26, by means of which a downward thrust of the mold 15 and fabric 10 through the shaping ring 23, may be subsequently achieved. As the assembly is attached in this manner, or immediately prior thereto, the vessel 24 is filled with boiling water 27 to a level sufficient to completely immerse the thermoplastic fabric 10. The water 27 is maintained therein at a boiling temperature by means of a steam coil 28, through which a constant flow of steam passes. As soon as the fabric 10 is immersed in the boiling water, a flow of cold water is introduced into the hollow mold 15 by means of a rubber hose 29. The flow rate of the cold water should be such as to permit the maintenance of the mold 15 at a desired temperature level below that of the water bath 27 without substantially reducing the temperature of the bath 27 as the colder water passes through the mold perforations 16.

After a brief interval during which time temperature equilibrium is established between the water bath 27, fabric 10 and shaping plate 22, pressure is gradually applied to the pressure handle 26, forcing the mold 15 and fabric 10 through the shaping ring 23. As the fabric 10 contacts the cooler mold 15 while passing through the shaping ring 23, the temperature of the material is reduced. The fabric area to which greatest distortional stress is applied, i.e., the area in direct contact with the mold 15 is, therefore, rendered relatively less plastic than unshaped fabric to which lesser stretching tension is applied, i.e., between the shaping ring 23 and the ring clamp 11. It is this temperature differential within the fabric during the stretching operation that is responsible for greater structural uniformity in the fabric of shaped textile articles prepared according to the present invention.

After the fabric 10 is drawn to desired shape, the flow of cold water from the rubber hose 29, through the mold 15, is stopped, and the pressure handle 26 locked in final position 30 for one or two minutes in order to permit the fabric 10 and mold 15 to attain temperature equilibrium with the water bath 27. The water bath 27 is then drained from the vessel 24, and the latter is then quickly refilled with cold water, cooling the entire assembly and the shaped fabric, which may subsequently be removed therefrom.

In an embodiment of the present invention, the shaping operation is performed while the fabric is heated to at least the second order transition temperature of the thermoplastic fibers therein, i.e., that temperature at which the amorphous phase of the fiber melts. The fabric should not, however, be elevated to temperatures effecting fabric damage, as evidenced by a noticeable color change or a fusing of fibers. For fabrics having a higher second order transition temperature than the temperature of boiling water, other suitable heating means may be employed in the method and apparatus heretofore described. For instance, the boiling water bath may be substituted by a steam bath, or the system may be enclosed and pressurized, thereby effecting even higher temperatures in the thermoplastic fabric.

The textile materials preferably employed in the method of the invention are those made from thermoplastic filaments having a second order transition temperature above the temperature at which the shaped article is ultimately to be used. Good results have been obtained, for example, utilizing fabrics composed of polymers or copolymers of acrylonitrile. If the second order transition temperature is, however, below the temperature of use, subsequent annealing treatment is ordinarily necessary.

The thermoplastic material employed may be a woven, non-woven or knitted fabric, and the fibers therein may be present in either substantially continuous or short staple lengths.

During the stretching operation, the temperature of the mold is reduced to that temperature which will permit the greatest uniformity of fabric structure in the shaped article, the means for said temperature reduction being compatible with the maintenance of a constant source of heat to the unshaped fabric. Control over the degree of resistance to deformation, and, therefore, of the strain within the fabric, can be exercised by controlling the temperatures of the various fabric areas in this manner.

In the apparatus described above, the mold was perforated with a total of one hundred and twenty-two holes, wherein a number 55 drill was employed to perforate the mold. The first row of holes was drilled 2½ inches from the apex of the mold, and consisted of twenty-three holes 1 inch apart. The second row, 1 inch below the first, consisted of twenty-two holes, 1 inch apart, staggered so that the centers of the second row of holes were midway between the centers of the first row. The third row, 1 inch below the second, consisted of nineteen holes 1 inch apart, staggered in the manner of the second row. The apex area of the mold was perforated with fifty-eight holes, spaced in a random manner ¾ inch apart. While this arrangement was found suitable to effectively facilitate the cooling of the mold by allowing cold water to circulate therethrough during the operation, any other means for utilizing a sufficiently cool mold may be employed. In addition, the mold may be made of any thermal conductive material capable of retaining its shape under the temperatures and pressures utilized herein. Particularly good results have been obtained with an aluminum mold.

Other changes or variations may be made in the manner in which the method is performed and in the apparatus for carrying it out without departing from the scope of the appended claims.

What is claimed is:

1. An improved method for imparting a permanently shaped section to a textile fabric composed of thermoplastic fibers which method comprises uniformly heating the entire body of said textile fabric to an elevated temperature at which said thermoplastic fibers are permanently deformable under stress; applying distortional stress to said textile fabric by the movement of a male mold member relative to and against the textile fabric while the textile fabric is clamped securely at the marginal edges thereof, thereby stretching over and in contact with said male mold member a limited section of the textile fabric, such limited section being encompassed within the larger textile fabric area defined by the clamped marginal edges of the textile fabric; cooling the section of said textile fabric contacting said male mold member simultaneously with the application of stress to the textile fabric while continuously heating the remaining area of the textile fabric which is situated between the section of the textile fabric contacting the male mold member and the clamped marginal edges of the textile fabric; and subsequently cooling the entire body of said textile fabric so as to obtain a permanently shaped section therein.

2. An improved method for imparting a permanently shaped section to a textile fabric composed of thermoplastic fibers which method comprises uniformly heating the entire body of said textile fabric to an elevated temperature at which said thermoplastic fibers are permanently deformable under stress; applying distortional stress to said textile fabric by the movement of a male mold member relative to and against the textile fabric while the textile fabric is clamped securely at the marginal edges thereof, thereby stretching over and in contact with said male mold member a limited section of the textile fabric, such limited section being encompassed within the larger textile fabric area defined by the clamped marginal edges of the textile fabric; cooling said male mold member, thereby cooling the section of said textile fabric contacting the male mold member simultaneously with the application of stress to the textile fabric while continuously heating the remaining area of the textile fabric which is situated between the section of the textile fabric contacting the male mold member and the clamped marginal edges of the textile fabric; and subsequently cooling the entire body of said textile fabric so as to obtain a permanently shaped section therein.

References Cited in the file of this patent

UNITED STATES PATENTS

| | | |
|---|---|---|
| 669,331 | Thurber | Mar. 5, 1901 |
| 2,190,807 | Steinberger | Feb. 20, 1940 |
| 2,211,742 | Halliwell | Aug. 13, 1940 |
| 2,225,117 | Helmstaedter | Sept. 9, 1941 |
| 2,304,989 | Snowdon | Dec. 15, 1942 |
| 2,357,806 | Borkland | Sept 12, 1944 |
| 2,385,143 | Levine | Sept. 18, 1945 |
| 2,452,999 | Daly et al. | Nov. 2, 1948 |
| 2,749,572 | Nowak | June 12, 1956 |

FOREIGN PATENTS

| | | |
|---|---|---|
| 669,240 | France | Aug. 3, 1929 |